US012803362B2

(12) United States Patent
Aso et al.

(10) Patent No.: US 12,803,362 B2
(45) Date of Patent: Nov. 17, 2026

(54) IN-WHEEL MOTOR

(71) Applicants: ISUZU MOTORS LIMITED, Yokohama (JP); DENSO CORPORATION, Kariya City (JP)

(72) Inventors: Mitsuhiro Aso, Fujisawa (JP); Hiroyuki Tsuchiya, Kariya (JP)

(73) Assignees: ISUZU MOTORS LIMITED, Yokohama (JP); DENSO CORPORATION, Kariya-City (JP)

( * ) Notice: Subject to any disclaimer, the term of this patent is extended or adjusted under 35 U.S.C. 154(b) by 190 days.

(21) Appl. No.: 18/719,827

(22) PCT Filed: Dec. 16, 2022

(86) PCT No.: PCT/JP2022/046514
§ 371 (c)(1),
(2) Date: Jun. 13, 2024

(87) PCT Pub. No.: WO2023/113024
PCT Pub. Date: Jun. 22, 2023

(65) Prior Publication Data

US 2025/0055344 A1 Feb. 13, 2025

(30) Foreign Application Priority Data

Dec. 17, 2021 (JP) ................................ 2021-205098

(51) Int. Cl.
*H02K 5/10* (2006.01)
*B60K 7/00* (2006.01)
(Continued)

(52) U.S. Cl.
CPC ............ *H02K 5/10* (2013.01); *B60K 7/0007* (2013.01); *H02K 1/2786* (2013.01); *H02K 7/10* (2013.01); *B60K 2007/0092* (2013.01)

(58) Field of Classification Search
CPC ........... H02K 5/10; H02K 7/10; H02K 1/2786
See application file for complete search history.

(56) References Cited

U.S. PATENT DOCUMENTS

2015/0144453 A1* 5/2015 Larkin .................. B60K 17/35 192/84.7
2017/0110933 A1* 4/2017 Michel .................. H02K 1/187
(Continued)

FOREIGN PATENT DOCUMENTS

CN 111469644 A 7/2020
JP 2005-333704 A 12/2005
(Continued)

OTHER PUBLICATIONS

Kanetani (JP 2020089223 A) English Translation (Year: 2020).*
International Search Report from International Application No. PCT/JP2022/046514 mailed Feb. 14, 2023.

*Primary Examiner* — Tulsidas C Patel
*Assistant Examiner* — Robert E Mates
(74) *Attorney, Agent, or Firm* — Shih IP Law Group, PLLC

(57) ABSTRACT

Provided is an in-wheel motor that can keep dust, water, etc. from infiltrating a motor. The present invention provides an outer-rotor in-wheel motor that comprises: a stator that has a coil; and a rotor that has a magnet that is opposite the coil. The rotor rotates around a motor axis relative to the stator. A seal member is interposed between the stator and the rotor.

1 Claim, 4 Drawing Sheets

(51) Int. Cl.
*H02K 1/2786* (2022.01)
*H02K 7/10* (2006.01)

(56) References Cited

U.S. PATENT DOCUMENTS

| | | | | |
|---|---|---|---|---|
| 2017/0324297 | A1* | 11/2017 | Furuuchi | H02K 7/14 |
| 2020/0112229 | A1* | 4/2020 | Yabuta | F16C 41/002 |
| 2021/0104942 | A1 | 4/2021 | Katsuta | |
| 2023/0094579 | A1 | 3/2023 | Yada | |

FOREIGN PATENT DOCUMENTS

| | | | | |
|---|---|---|---|---|
| JP | 2006-282158 | A | 10/2006 | |
| JP | 2007-145060 | A | 6/2007 | |
| JP | 2013-071698 | A | 4/2013 | |
| JP | 2015-083440 | A | 4/2015 | |
| JP | 2017-519680 | A | 7/2017 | |
| JP | 2018-164366 | A | 10/2018 | |
| JP | 2019-060413 | A | 4/2019 | |
| JP | 2020089223 | A * | 6/2020 | H02K 5/10 |
| JP | 2020-114054 | A | 7/2020 | |
| WO | 2021251299 | A1 | 12/2021 | |

* cited by examiner

IN-WHEEL MOTOR

TECHNICAL FIELD

The present disclosure relates to an in-wheel motor of an outer-rotor type.

BACKGROUND ART

In the related art, an in-wheel motor incorporated in a wheel is known as a driving source for a wheel assembly of an electric vehicle. The in-wheel motor includes: a stator which includes a coil; and a rotor in which a magnet is disposed so as to face the coil. In the in-wheel motor, a magnetic field generated by a current flowing through the coil attracts and repels the magnet, and thus, the rotor rotates and this rotational force is transmitted to the wheel via a hub to rotate a driving wheel assembly.

For example, as an exemplary in-wheel motor, Patent Literatures (hereinafter, “Patent Literature” will be referred to as “PTL”) 1 and 2 disclose an in-wheel motor of an outer-rotor type in which a rotor is disposed on the outer side of a stator in the radial direction. In such an in-wheel motor of an outer-rotor type, it is possible to prevent a magnet from bursting due to a centrifugal force generated by the rotation of the rotor, by disposing the magnet on the inner side of a rotor case in the radial direction.

CITATION LIST

Patent Literature

PTL 1
Japanese Patent Application Laid-Open No. 2020-114054
PTL 2
Japanese Patent Application Laid-Open No. 2018-164366

SUMMARY OF INVENTION

Technical Problem

Incidentally, in the case of an in-wheel motor of an outer-rotor type, a stator is disposed on the inner side of a rotor in the radial direction, and thus, the side of one end of a rotor case in the motor axis direction is open. For this reason, dust, water, and/or the like may intrude into the rotor and cause damage to the motor.

An object of the present disclosure is to provide an in-wheel motor capable of preventing dust and/or water from intruding into the motor.

Solution to Problem

An in-wheel motor according to the present disclosure is an in-wheel motor of an outer-rotor type including: a stator that includes a coil; and a rotor that includes a magnet facing the coil and rotates around a motor axis with respect to the stator. A seal member is interposed between the rotor and the stator.

Advantageous Effects of Invention

The in-wheel motor according to the present disclosure is capable of preventing dust and/or water from intruding into the motor.

DESCRIPTION OF EMBODIMENTS

Hereinafter, an embodiment of the present disclosure will be described with reference to the accompanying drawings.

Figure 1A:
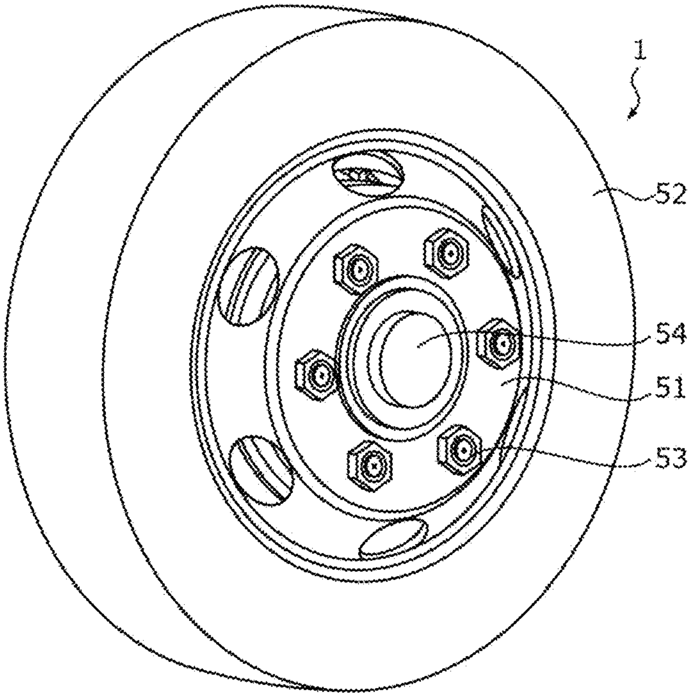
FIG. 1A and FIG. 1B are perspective views of a driving wheel assembly in which an in-wheel motor is incorporated according to an embodiment.
Figure 1B:
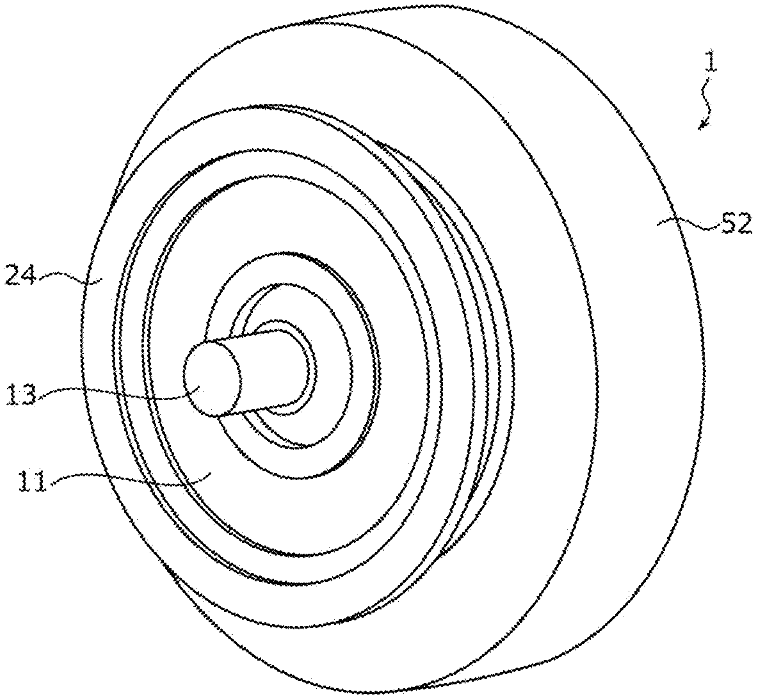

FIGS. 1A and 1B illustrate driving wheel assembly 1 in which in-wheel motor IWM is incorporated according to an embodiment of the present disclosure. FIG. 1A is a perspective view of driving wheel assembly 1 as viewed from an outer side in a wheel assembly width direction, and FIG. 1B is a perspective view of driving wheel assembly 1 as viewed from an inner side in the wheel assembly width direction. Note that, the wheel assembly width direction is the same as a motor axis direction of in-wheel motor IWM. Further, the direction orthogonal to the motor axis direction will be referred to as “radial direction”.

Figure 2:
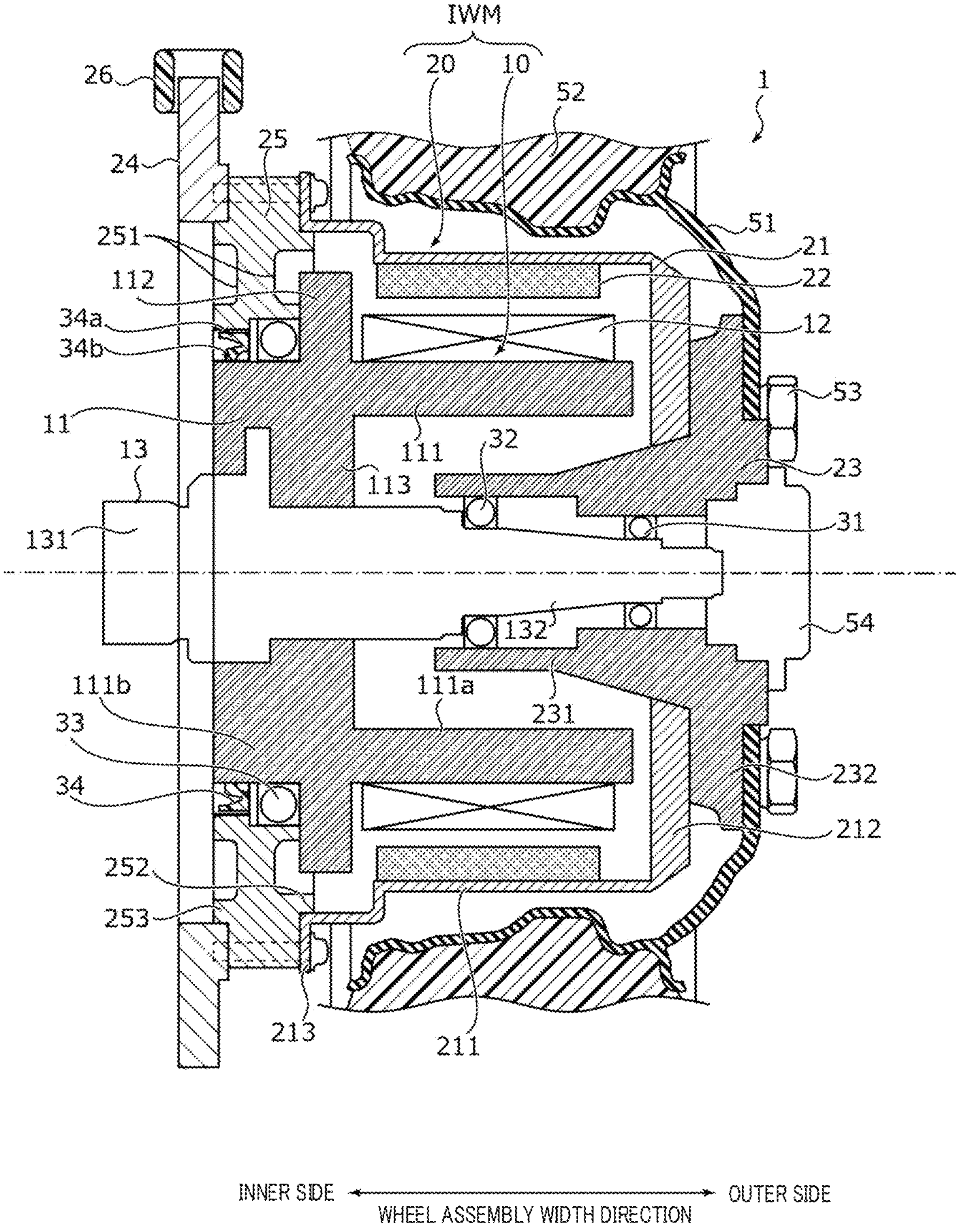
FIG. 2 schematically illustrates a cross section of the driving wheel assembly according to the embodiment.
Figure 3:
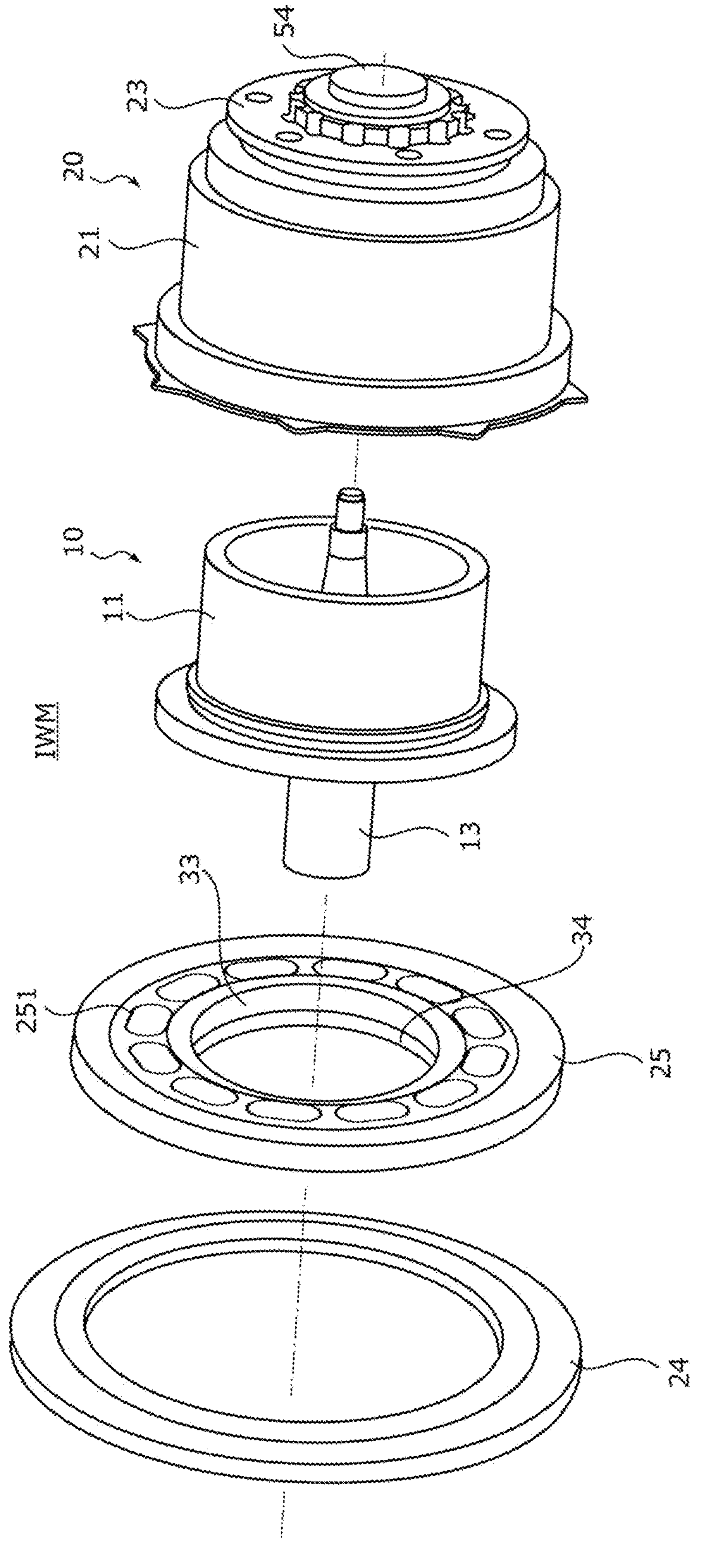
FIG. 3 is an exploded perspective view of the in-wheel motor according to the embodiment.
Figure 4:
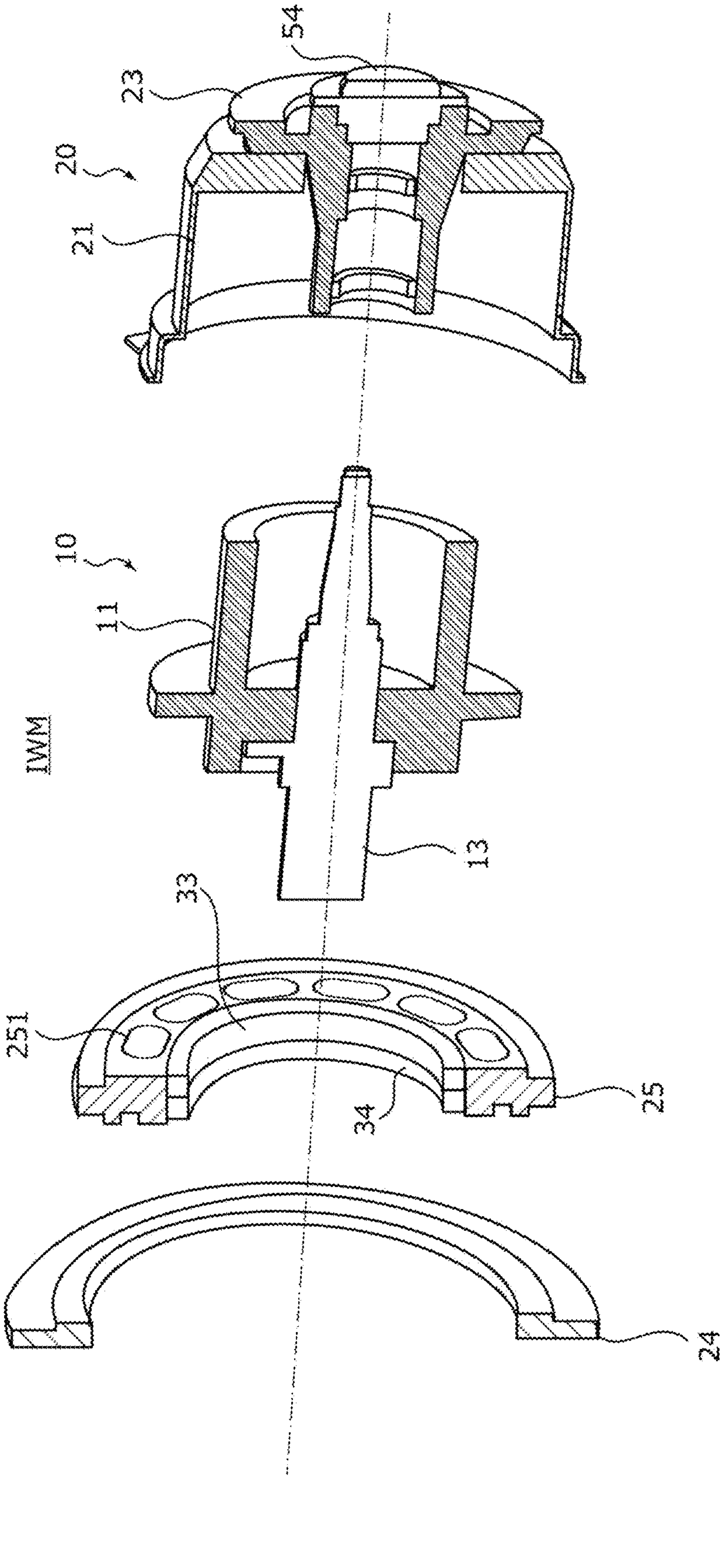
FIG. 4 is an exploded perspective cross-sectional view of the in-wheel motor according to the embodiment.

FIG. 2 schematically illustrates a cross section of driving wheel assembly 1. FIG. 3 is an exploded perspective view of in-wheel motor IWM. FIG. 4 is an exploded perspective cross-sectional view of in-wheel motor IWM.

As illustrated in FIGS. 1A, 1B, and 2, driving wheel assembly 1 includes in-wheel motor IWM, wheel 51, tire 52, and the like. In driving wheel assembly 1, wheel 51 made of metal is attached to the inner side of tire 52, and in-wheel motor IWM is incorporated in wheel 51.

As illustrated in FIGS. 2 to 4, in-wheel motor IWM includes stator 10 and rotor 20.

Stator 10 is a fixed body that generates a driving force for rotating rotor 20, and includes stator body 11, coil 12, spindle shaft 13, and the like.

Rotor 20 is a moving body that rotates around the motor axis with respect to stator 10, and includes rotor case 21, magnet 22, hub 23, brake disc 24, drive plate 25, and the like.

In-wheel motor IWM is a motor of an outer-rotor type in which rotor 20 is disposed on the outer side of stator 10 in the radial direction. First to third bearings 31 to 33 are interposed between stator 10 and rotor 20, and rotor 20 is smoothly rotatable with respect to stator 10 without wear.

Stator body 11 includes main body 111, flange part 112, and shaft attachment part 113.

Main body 111 has a hollow cylindrical shape. Flange part 112 is formed on the outer circumferential surface of main body 111 so as to project annularly to the outer side in the radial direction. Main body 111 is partitioned into coil disposition part 111*a*, which is on the outer side of flange part 112 in the wheel assembly width direction, and rotor support part 1/1*b*, which is on the inner side of flange part 112 in the wheel assembly width direction. Shaft attachment part 113 is formed on the inner circumferential surface of main body 111 so as to project to the inner side in the radial direction, and includes a shaft insertion hole (reference sign is omitted) in the center.

Coil 12 is, for example, wound around the outer circumferential surface of coil disposition part 111*a* of stator body 11. Note that, coil 12 is omitted in FIGS. 3 and 4. For example, coil 12 is energized with a multi-phase AC such as a three-phase AC. The energization current to coil 12 is controlled by an inverter (illustration is omitted).

Spindle shaft 13 is a shaft member disposed in the center of in-wheel motor IWM along the wheel assembly width direction, and pivotally supports rotor 20. In the present embodiment, spindle shaft 13 and stator body 11 function as a shaft member that pivotally supports rotor 20.

Spindle shaft 13 is inserted through shaft attachment part 113 of stator body 11, and is fastened and secured, for example, by bolts (illustration is omitted). First shaft end part 131 of spindle shaft 13 on the inner side in the wheel assembly width direction is attached to, for example, a knuckle of a front wheel assembly or to a suspension arm of a rear wheel assembly (for both of which illustration is omitted). Second shaft end part 132 of spindle shaft 13 on the outer side in the wheel assembly width direction pivotally supports rotor 20.

Rotor case 21 includes main case 211, hub attachment part 212, and plate attachment part 213. Stator 10 is disposed inside rotor case 21.

Main case 211 has a hollow cylindrical shape and holds magnet 22 on the inner circumferential surface. Hub attachment part 212 is provided on the outer side of main case 211 in the wheel assembly width direction. The end part of main case 211 on the inner side in the wheel assembly width direction is, on the other hand, is open such that stator 10 can be assembled.

Hub attachment part 212 is formed so as to close the end part of main case 211 on the outer side in the wheel assembly width direction, and includes a Hub insertion port (reference sign is omitted) in the center.

Plate attachment part 213 is formed at the open end of main case 211 so as to project to the outer side in the radial direction.

Magnet 22 is disposed on the inner circumferential surface of main case 211. When in-wheel motor IWM is assembled, magnet 22 faces coil 12 in a state in which both are separate from each other.

Hub 23 includes hub main body 231 and case attachment part 232, and rotates integrally with rotor case 21 and the like as a part of rotor 20. Hub main body 231 has a hollow cylindrical shape. When in-wheel motor IWM is assembled, second shaft end part 132 of spindle shaft 13 is located inside hub main body 231. Hub 23 is rotatably supported by second shaft end part 132 of spindle shaft 13 via first bearing 31 and the second bearing 32.

Case attachment part 232 is formed in the end part of hub main body 231 so as to project to the outer side in the wheel assembly width direction. Hub 23 is secured to rotor case 21 by fitting hub main body 231 into hub attachment part 212 of rotor case 21 and fastening case attachment part 232 to hub attachment part 212, for example, by bolts (illustration is omitted) in a state in which case attachment part 232 and hub attachment part 212 face each other. Although illustration is omitted, a seal member is disposed between hub attachment part 212 and case attachment part 232, thereby ensuring air-tightness inside rotor case 21.

Further, wheel 51 is fastened and secured to case attachment part 232 of hub 23 by stud bolts 53. Wheel cap 54 is secured to the center of case attachment part 232 in the radial direction.

That is, in the present embodiment, it is structured such that the load from tire 52 is supported by wheel 51, hub 23, first bearing 31, second bearing 32, and spindle shaft 13, and is not inputted to stator body 11 and rotor case 21. Since deformation of stator body 11 or rotor case 21 due to the load input from tire 52 is prevented thereby, it is possible to keep the separation distance between coil 12 and magnet 22 constant and the driving performance of in-wheel motor IWM stabilizes.

Brake disc 24 has an annular shape, and rotates integrally with rotor case 21 and the like as a part of rotor 20. The outer diameter of brake disc 24 is larger than the outer diameter of drive plate 25 and protrudes from the outer circumferential edge of drive plate 25 to the outer side in the radial direction. Brake caliper 26 is disposed so as to hold this portion in between.

Drive plate 25 has an annular shape, and rotates integrally with rotor case 21 and the like as a part of rotor 20. Plate attachment part 213 of rotor case 21 is disposed on the surface of drive plate 25 on the outer side in the wheel assembly width direction to face drive plate 25, and is fastened and secured, for example, by bolts (reference sign is omitted). Further, brake disc 24 is disposed on the surface of drive plate 25 on the inner side in the wheel assembly width direction to face drive plate 25, and is fastened and secured, for example, by bolts (reference sign is omitted). That is, drive plate 25 is interposed between rotor case 21 and brake disc 24.

In FIG. 2 and the like, both the main surfaces of drive plate 25 are provided with engagement protrusion parts 252 and 253, and engagement protrusion parts 252 and 253 are configured to be fitted into rotor case 21 and brake disc 24, respectively.

When in-wheel motor IWM is assembled, rotor support part **1*l*1*b* of stator body 11 is located on the inner circumferential surface side of drive plate 25. Drive plate 25 is rotatably supported by rotor support part 1*l*1*b* via third bearing 33**.

In in-wheel motor IWM, hub 23, which constitutes rotor 20, is pivotally supported by spindle shaft 13, which constitutes stator 10, via first bearing 31 and second bearing 32 on the outer side in the wheel assembly width direction. Further, drive plate 25, which constitutes rotor 20, is pivotally supported by stator body 11, which constitutes stator 10, via third bearing 33 on the inner side in the wheel assembly width direction. That is, rotor 20 is pivotally supported by stator 10 at both end parts in the wheel assembly width direction.

Thus, no runout occurs in rotor 20 when in-wheel motor IWM is driven, and rotor 20 rotates in a stable posture around the motor axis. Accordingly, it is not necessary to increase the separation distance between rotor 20 and stator 10 in order to avoid a collision therebetween, which may be caused by runout of rotor 20, and since the separation distance between magnet 22 and coil 12 does not fluctuate, it is possible to obtain an expected driving performance. Further, it is possible to achieve a size reduction in in-wheel motor IWM.

Further, since it is structured such that drive plate 25 is pivotally supported by stator 10, rotor 20 can be easily pivotally supported even on the side of the open end part of rotor case 21.

On the inner side of third bearing 33 in the wheel assembly width direction, seal member 34 is disposed between drive plate 25 and rotor support part **1*l*1*b*. Seal member 34 is a mechanical element having a sealing function, and prevents intrusion of dust and water from outside. Seal member 34** is constituted by, for example, an oil seal, and is disposed such that a seal lip part faces the inner side in the wheel assembly width direction.

Seal member 34 is preferably disposed such that outer diameter part **34*a*, which comes in contact with drive plate 25, becomes a fixed part and inner diameter part 34***b*, which comes in contact with stator body 1, becomes a sliding part. In this case, the sliding diameter becomes small, and thus, wear and loss torque of seal member 34 can be reduced.

Further, a surface treatment such as anodizing or DLC (Diamond Like Carbon), or casting of an iron ring may be applied to the sliding portion in stator body 11, which comes in contact with inner diameter part 34*b* of seal member 34, in order to increase the surface hardness. Further, a lubricant such as grease may be applied to the sliding portion in stator body 11 in order to enhance the slidability. Thus, it is possible to reduce wear of inner diameter part 34*b* of seal member 34.

In addition, drive plate 25 may be provided with a C-ring, collar or caulking to prevent seal member 34 from coming off.

Drive plate 25 is disposed on a heat transmission path from brake disc 24 to rotor case 21, and functions as a heat capacity member. The frictional heat generated in brake disc 24 is not directly transmitted to rotor case 21, but is stored in drive plate 25, and thus, it is possible to suppress an increase in the temperature of rotor case 21. Accordingly, it is possible to prevent demagnetization of magnet 22 disposed in rotor case 21 from occurring due to a thermal influence.

Drive plate 25 is formed of, for example, of a metal material such as an aluminum alloy. Thus, drive plate 25 functions as a heat capacity member, and the rigidity as a power transmission member that transmits a braking force from brake disc 24 to rotor case 21 is also ensured.

Note that, the volume of drive plate 25 is preferably large from the viewpoint of the heat capacity member. Having said that, when the thickness in the wheel assembly width direction is simply made larger, in-wheel motor IWM becomes larger in the wheel assembly width direction, and thus, drive plate 25 is designed in view of this point.

Further, heat radiation structure 251 is formed on both the main surfaces of drive plate 25. Heat radiation structure 251 may be a structure for increasing the surface area of drive plate 25, and may be, for example, a recessed part as illustrated in FIG. 2 or the like, or may have a fin shape. By providing drive plate 25 with heat radiation structure 251, the effect of suppressing heat transmission from brake disc 24 to magnet 22 is enhanced.

Stator 10 and rotor 20 are positioned and secured such that coil 12 and magnet 22 face each other at a predetermined distance. A magnetic field generated by a current flowing through coil 12 attracts and repels magnet 22, and thus, rotor 20 rotates. This rotational force is transmitted to wheel 51 and rotates driving wheel assembly 1. In the case of in-wheel motor IWM of an outer-rotor type, magnet 22 is disposed on the inner circumferential surface of rotor case 21, and thus, is held in a stable posture without bursting even when a centrifugal force is generated by the rotation of rotor 20.

Further, a frictional force is generated when a pad of brake caliper 26 is pressed against brake disc 24, and the rotation of rotor 20 including brake disc 24, and further the rotation of driving wheel assembly 1 are braked.

Note that, although illustration is omitted, stator 10 and rotor 20 are provided with a resolver that detects the rotational state (for example, the rotation angle and rotation direction) of rotor 20. Further, a cooling water channel for cooling in-wheel motor IWM, wiring to coil 12 and the resolver (illustration is omitted), and the like are disposed within stator body 11. The cooling water channel and the wiring are led out to outside via a water supply and drainage port and a wiring connector provided in the end part of stator body 11 on the inner side in the wheel assembly width direction.

In a case where drive plate 25 is structured to be pivotally supported by spindle shaft 13 on the inner side in the wheel assembly width direction, the space for drawing the cooling water channel and/or the wiring into in-wheel motor IWM is significantly restricted by drive plate 25. In the present embodiment, on the other hand, it is structured such that drive plate 25 is pivotally supported by stator body 11, that is, it is structured such that stator 10 is open to outside from the inside of drive plate 25. Thus, the cooling water channel and/or the wiring can be easily drawn into in-wheel motor IWM without hindering the rotation of rotor 20, and the degree of freedom in design is enhanced.

As described above, in-wheel motor IWM according to the present embodiment is an in-wheel motor of an outer-rotor type including: stator 10 that includes coil 12; and rotor 20 that includes magnet 22, which faces coil 12, and rotates around the motor axis with respect to stator 10. Seal member 34 is interposed between rotor 20 and stator 10.

Thus, it is possible to prevent dust and/or water from intruding into in-wheel motor IWM.

Specifically, in in-wheel motor IWM, rotor 20 further includes: rotor case 21 that includes an inner end part in the wheel assembly width direction, where the inner end part is open; and drive plate 25 (rotating body) that is connected to the inner end part of rotor case 21 and rotates together with rotor case 21, and seal member 34 is disposed between drive plate 25 and stator 10.

Thus, it is possible to easily prevent dust and/or water from intruding into in-wheel motor IWM even on the side of the open end part of rotor case 21.

Further, in in-wheel motor IWM, stator 10 further includes: spindle shaft 13 that forms the motor axis; and stator body 11 that is disposed on the outer side of spindle shaft 13 in the radial direction, drive plate 25 (rotating body) is pivotally supported by stator body 11, and seal member 34 is disposed between drive plate 25 and stator body 11.

Thus, it is structured such that stator 10 is open to outside from the inside of drive plate 25, and thus, the cooling water channel and/or the wiring can be easily drawn into in-wheel motor IWM without hindering the rotation of rotor 20, and the degree of freedom in design is enhanced.

Further, in in-wheel motor IWM, rotor 20 further includes brake disc 24 that rotates integrally with rotor case 21, and the rotating body connected to the inner end part of rotor case 21 is drive plate 25 interposed between rotor case 21 and brake disc 24.

Since drive plate 25 functions as a heat capacity member, it is possible to prevent intrusion of dust and/or water and to suppress heat transmission from brake disc 24 to magnet 22, and it is possible to prevent demagnetization of magnet 22 due to a thermal influence.

Although the invention made by the present inventors has been specifically described above based on the embodiment, the present invention is not limited to the above-described embodiment and variations can be made without departing from the gist thereof.

For example, the sizes and shapes of the respective components are not limited to the illustrated aspects.

Further, it may be structured such that seal member 34 is interposed between rotor 20 and stator 10 and, for example, brake disc 24 may be directly connected to the inner end part of rotor case 21, and the seal member 34 may be interposed between brake disc 24 and stator 10.

The embodiment disclosed herein is a merely exemplification in every respect and should not be considered as limitative. The scope of the present invention is specified not by the description provided above, but by the appended claims, and is intended to include all modifications within the scope of the appended claims or the equivalents thereof.

The disclosure of Japanese Patent Application No. 2021-205098, filed on Dec. 17, 2021, including the specification, drawings and abstract, is incorporated herein by reference in its entirety.

INDUSTRIAL APPLICABILITY

The present disclosure is useful for an in-wheel motor of an outer-rotor type that is mounted in a driving wheel assembly of a vehicle.

REFERENCE SIGNS LIST

IWM In-wheel motor
1 Driving wheel assembly
10 Stator
11 Stator body
12 Coil
13 Spindle shaft
20 Rotor
21 Rotor case
22 Magnet
23 Hub
24 Brake disc
25 Drive plate
26 Brake caliper

31 to 33 First to third bearings
34 Seal member
51 Wheel
52 Tire

The invention claimed is:

1. An in-wheel motor of an outer-rotor type, the in-wheel motor comprising:

a stator that includes a coil; and a rotor that includes a magnet and rotates around a motor axis with respect to the stator, the magnet facing the coil, wherein the stator further includes:

a spindle shaft that forms the motor axis; and a stator body that is disposed on an outer side of the spindle shaft in a radial direction, wherein the rotor further includes:

a rotor case that includes an inner end part in a wheel assembly width direction, the inner end part being open:

a rotating body that is connected to the inner end part of the rotor case, is pivotally supported by the stator body, and rotates together with the rotor case; and a brake disc that rotates integrally with the rotor case, wherein the rotating body is a drive plate interposed between the rotor case and the brake disc, wherein a seal member is interposed between the rotor and the stator wherein the seal member is disposed between the drive plate and the stator body, and wherein a heat radiation structure having a recessed shape is formed on a main surface of the drive plate.

* * * * *